(12) United States Patent
Lu et al.

(10) Patent No.: US 9,403,415 B2
(45) Date of Patent: Aug. 2, 2016

(54) GPS BASED PITCH SENSING FOR AN INTEGRATED STABILITY CONTROL SYSTEM

(75) Inventors: Jianbo Lu, Livonia, MI (US); Dimitar Petrov Filev, Novi, MI (US); Kwaku O. Prakah-Asante, Commerce Township, MI (US); David M. Bevly, Auburn, AL (US); Jonathan Ryan, Auburn, AL (US)

(73) Assignee: Ford Global Technologies, Dearborn, MI (US)

( * ) Notice: Subject to any disclaimer, the term of this patent is extended or adjusted under 35 U.S.C. 154(b) by 698 days.

(21) Appl. No.: 12/888,546

(22) Filed: Sep. 23, 2010

(65) Prior Publication Data

US 2011/0087398 A1    Apr. 14, 2011

Related U.S. Application Data

(60) Provisional application No. 61/250,790, filed on Oct. 12, 2009.

(51) Int. Cl.
| | |
|---|---|
| *G06F 19/00* | (2011.01) |
| *B60G 17/019* | (2006.01) |
| *B60G 17/0165* | (2006.01) |
| *B60G 17/0195* | (2006.01) |
| *B60W 40/11* | (2012.01) |
| *B60W 40/112* | (2012.01) |
| *B60W 40/114* | (2012.01) |

(52) U.S. Cl.
CPC .......... *B60G 17/019* (2013.01); *B60G 17/0165* (2013.01); *B60G 17/0195* (2013.01); *B60W 40/11* (2013.01); *B60W 40/112* (2013.01); *B60W 40/114* (2013.01); *B60G 2400/34* (2013.01); *B60G 2400/39* (2013.01); *B60G 2400/41* (2013.01); *B60G 2401/16* (2013.01); *B60G 2500/20* (2013.01); *B60G 2800/94* (2013.01); *B60W 2420/905* (2013.01); *B60W 2520/105* (2013.01); *B60W 2520/125* (2013.01); *B60W 2520/14* (2013.01); *B60W 2520/18* (2013.01); *B60W 2550/402* (2013.01)

(58) Field of Classification Search
CPC ...................................................... B60W 40/11
See application file for complete search history.

(56) References Cited

U.S. PATENT DOCUMENTS

| | | | | |
|---|---|---|---|---|
| 5,617,317 A | * | 4/1997 | Ignagni | G01C 21/165 342/357.31 |
| 5,862,511 A | * | 1/1999 | Croyle | G01C 21/28 701/445 |

(Continued)

FOREIGN PATENT DOCUMENTS

| | | |
|---|---|---|
| EP | 870172 A1 | 10/1998 |
| EP | 1327858 A2 | 7/2003 |

OTHER PUBLICATIONS

Global Positioning System (GPS): A Low-Cost Velocity Sensor for Correcting Inertial Sensor Errors on Ground Vehicles.

*Primary Examiner* — Jonathan L Sample
(74) *Attorney, Agent, or Firm* — Angela M. Brunetti; Raymond Coppiellie (57) ABSTRACT

A system and method for sensing vehicle global pitch angle and rate that uses global velocities measured from a single antenna global positioning system (GPS) receiver together with sensor fusion algorithms involving sensor signals and other computed signals. This constructed, or computed, vehicle body's pitch angle may replace the role of a pitch rate sensor in an integrated stability control system. Namely, it achieves enhanced vehicle state estimation without the need for a pitch rate sensor.

22 Claims, 6 Drawing Sheets

(56) References Cited

U.S. PATENT DOCUMENTS

| | | | | |
|---|---|---|---|---|
| 6,029,111 A * | 2/2000 | Croyle | G01C 21/165 | 701/468 |
| 6,389,333 B1 * | 5/2002 | Hansman | G01C 23/00 | 701/14 |
| 6,427,122 B1 * | 7/2002 | Lin | G01C 21/165 | 342/26 B |
| 6,445,983 B1 * | 9/2002 | Dickson | A01B 69/008 | 701/23 |
| 6,721,636 B1 | 4/2004 | Gade | | |
| 7,164,973 B2 * | 1/2007 | Arndt | B60T 8/172 | 180/170 |
| 7,222,007 B2 * | 5/2007 | Xu | B60G 17/016 | 180/252 |
| 7,325,454 B2 | 2/2008 | Saito | | |
| 7,480,547 B2 * | 1/2009 | Brown | B60W 30/04 | 280/5.5 |
| 7,522,999 B2 | 4/2009 | Wence | | |
| 7,681,960 B2 * | 3/2010 | Wanke | B60T 8/17555 | 303/146 |
| 7,885,750 B2 * | 2/2011 | Lu | B60T 8/17552 | 180/197 |
| 8,065,074 B1 * | 11/2011 | Liccardo | G01C 21/165 | 701/480 |
| 8,321,088 B2 * | 11/2012 | Brown | B60T 8/17552 | 180/271 |
| 2002/0022924 A1 | 2/2002 | Begin | | |
| 2003/0130778 A1 * | 7/2003 | Hrovat | B62D 7/159 | 701/45 |
| 2003/0149512 A1 * | 8/2003 | Hrovat | B60T 8/172 | 701/1 |
| 2003/0163231 A1 | 8/2003 | Meyers | | |
| 2004/0059480 A1 * | 3/2004 | Hrovat | B60G 17/0162 | 701/29.2 |
| 2005/0060093 A1 * | 3/2005 | Ford | G01C 21/165 | 701/472 |
| 2005/0149240 A1 * | 7/2005 | Tseng | B60G 17/016 | 701/38 |
| 2005/0234644 A1 * | 10/2005 | Lin | G01C 21/005 | 701/470 |
| 2005/0288842 A1 * | 12/2005 | Brewer | B60G 17/018 | 701/70 |
| 2006/0235575 A1 * | 10/2006 | Brown | B60W 30/04 | 701/1 |
| 2007/0067085 A1 * | 3/2007 | Lu | B60T 8/172 | 701/70 |
| 2007/0124076 A1 * | 5/2007 | Ockerse | G01C 17/28 | 701/530 |
| 2007/0170667 A1 * | 7/2007 | Xu | B60R 21/0132 | 280/5.507 |
| 2007/0288166 A1 * | 12/2007 | Ockerse | G01C 17/28 | 701/530 |
| 2008/0059021 A1 * | 3/2008 | Lu | B60G 17/0195 | 701/36 |
| 2008/0086248 A1 * | 4/2008 | Lu | G05D 1/0891 | 701/41 |
| 2008/0147280 A1 * | 6/2008 | Breed | B60J 10/00 | 701/46 |
| 2008/0161990 A1 * | 7/2008 | Gansler | B60W 40/11 | 701/38 |
| 2008/0234933 A1 * | 9/2008 | Chowdhary | G01C 21/12 | 701/479 |
| 2009/0171585 A1 * | 7/2009 | Hoshizaki | G01S 19/49 | 701/480 |
| 2009/0254294 A1 * | 10/2009 | Dutta | G01C 17/28 | 702/92 |
| 2010/0057360 A1 * | 3/2010 | Ohkubo | G01C 21/16 | 701/500 |
| 2010/0082202 A1 * | 4/2010 | Moshchuk | B60G 17/0182 | 701/37 |
| 2010/0084513 A1 * | 4/2010 | Gariepy | B64C 39/024 | 244/190 |
| 2011/0098894 A1 * | 4/2011 | Zeng | B60J 3/0204 | 701/49 |
| 2011/0112739 A1 * | 5/2011 | O'Dea | G01S 19/52 | 701/70 |
| 2011/0202204 A1 * | 8/2011 | Kahn | G01S 19/49 | 701/3 |
| 2011/0246020 A1 * | 10/2011 | Munnix | B60W 40/10 | 701/29.2 |

\* cited by examiner

GPS BASED PITCH SENSING FOR AN INTEGRATED STABILITY CONTROL SYSTEM

CROSS REFERENCE

This application claims the benefit of the filing date of U.S. Provisional Application Ser. No. 61/250,790 filed Oct. 12, 2009, entitled GPS Velocity Aided Vehicle State Estimation the entire disclosure of which is hereby incorporated by reference into the present disclosure.

TECHNICAL FIELD

The present invention is related to integrating stability control functions and more particularly to sensing pitch rate and angle for estimating vehicle states in an integrated stability control system.

BACKGROUND

A goal of a vehicle stability control system is to stabilize yawing, rolling, and lateral drifting motions of a motor vehicle during all driving conditions, on all road surfaces, and within a full range of driving speeds. A system capable of achieving such a goal is called an integrated stability control (ISC) system.

Existing stability control systems were initially developed to attenuate undesired vehicle yawing motion and are known as electronic stability control (ESC) systems. Improvements to ESC systems went on to include roll and lateral drifting directional stabilization and are known as roll stability control (RSC) systems. The roll stability control (RSC) system achieves roll and lateral drifting stabilizations for a vehicle driven on road surfaces that have high friction levels whereby on-road rollover may be possible.

Stability control systems, such as RSC systems, are typically equipped with a motion sensor cluster, or set, that may include a roll rate sensor, a yaw rate sensor, a longitudinal accelerometer and a lateral accelerometer. RSC systems use a roll rate sensor and control algorithms in addition to the standard ESC systems to enhance vehicle state estimation, thereby refining the control performances. Refined control performance is mainly due to the fact that the added roll sensing leads to a more accurate total vehicle roll angle sensing such that lateral drifting, also known as side slipping, may be detected from the on-board lateral accelerometer. Side slipping may be detected as soon as the actual motion induced lateral acceleration exceeds a predetermined level of uncertainty associated with the lateral accelerometer sensor, such as, for example, when a signal-to-uncertainty ratio (SUR) for the lateral acceleration is large. The lateral acceleration sensing uncertainties may result from the sensor noise, the sensor zero-crossing drift, the sensor scaling factor nonlinearity, the sensor crossing axis sensitivity, etc., as well as any unmeasured road bank uncertainties. Similar sensing uncertainties may be present for the other sensor elements.

However, an unstable condition may also happen for a low sensing signal-to-uncertainty ratio driving event. For instance, driving on a snowy and/or icy surface, the vehicle's cornering acceleration level is usually low yet the vehicle may still enter into a large drifting/side slipping motion. In this case, the actual cornering acceleration is very close to the accelerometer sensing uncertainty level, i.e., the sensing signal-to-uncertainty ratio is close to 1. Lateral instability may be determined from a sideslip angle computed from the longitudinal and lateral vehicle body velocities, which are estimated from the first integrals of accelerations together with the double integrals of angular rates. When the sensing signal-to-uncertainty ratio is close to 1, the integral of the sensing uncertainty could dominate the estimation. Hence it is important to remove sensing uncertainties and boost the sensing signal-to-uncertainty ratio. One way to do this is to enhance the sensing capability so as to differentiate road influence from the sensing uncertainty. For instance, a vertical accelerometer and/or a pitch rate sensor may be added to the sensor set used in roll stability control in order to remove sensing uncertainties due to the road influence.

While it is highly desirable to enhance sensing capability to remove the sensing uncertainties for vehicle states with low signal-to-uncertainty driving conditions, there is a need to develop a more cost effective approach than adding costly sensors.

SUMMARY

The inventive subject matter uses GPS information available from an onboard GPS unit that is used for non-stability control purposes such as navigation or connectivity, to conduct sensor fusion with vehicle motion sensors so as to achieve enhanced vehicle state estimation. More specifically, the present invention is a system and method for sensing vehicle global pitch angle or road grade that uses global velocities measured from a single antenna global positioning system (GPS) receiver together with sensor fusion algorithms involving other sensor signals and other computed signals. This constructed, or computed, vehicle body's pitch angle may replace the role of a pitch rate sensor in an integrated stability control system. Namely, it achieves enhanced vehicle state estimation without the need for a pitch rate sensor.

One embodiment of the present invention is a pitch sensing system used by an integrated stability control system of a motor vehicle wherein a pitch computation is estimated from global vehicle velocities acquired by a GPS receiver.

In another embodiment of the present invention an integrated stability control system for a motor vehicle having a GPS receiver capable of acquiring three-dimensional vehicle velocity measurements provides a pitch computation indicative of the vehicle pitch angle and pitch rate as it is estimated using vehicle velocity measurements acquired from the GPS receiver.

In a method of the present invention, a motor vehicle having a GPS receiver and at least one stability control system acquires three dimensional global vehicle velocity measurements from the GPS receiver and estimates a pitch angle and/or rate of the vehicle.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter.

Figure 1:
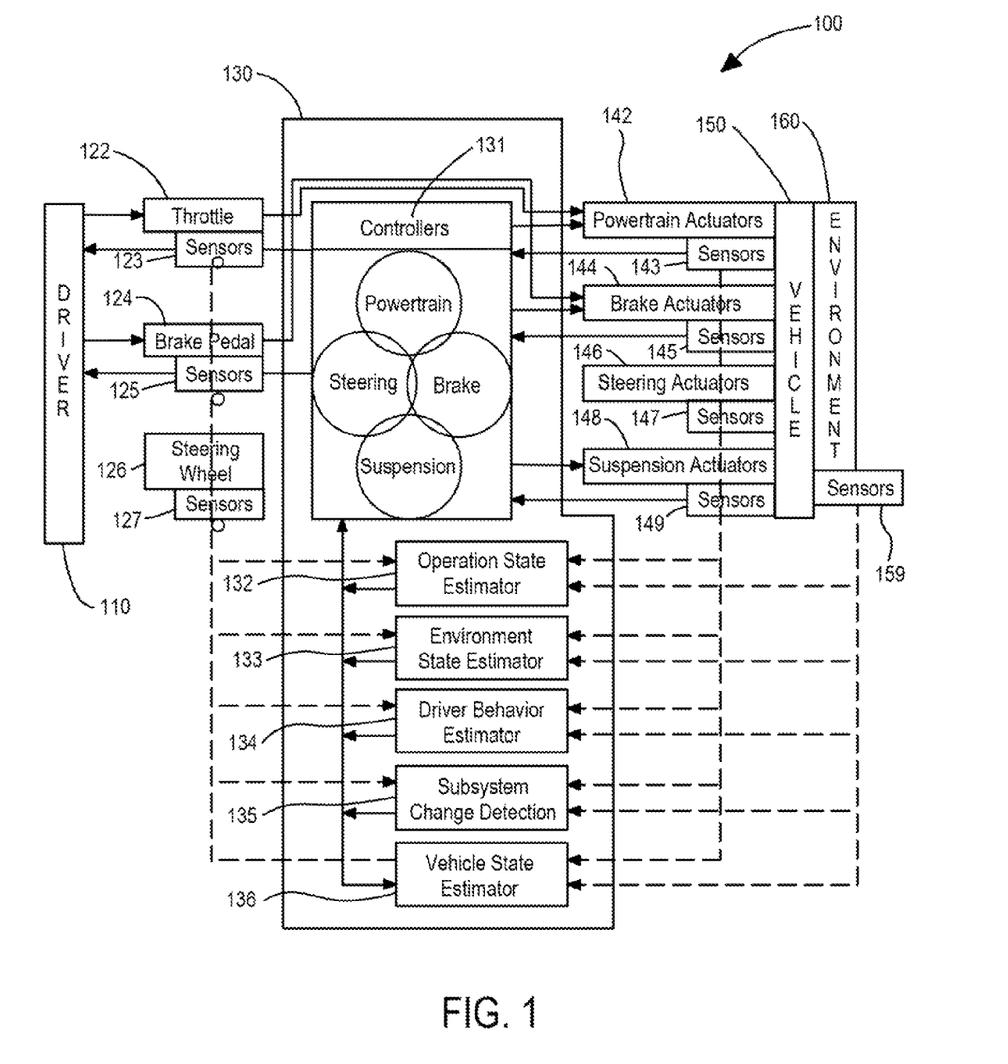
FIG. 1 is a block diagram of electronically controlled systems available on a motor vehicle.

Referring to FIG. 1 there is shown a block diagram of a closed-loop control system 100 for a vehicle under the influence of both driver control and various electronic controls. The driver control from driver 110 is conducted through throttle 122, brake 124, and steering 126. The driver receives control "feels" such as gas pedal feel, brake pedal feel, and steering feel through the sensing mechanisms 123, 125, 127 (e.g., throttle, pedal, steering wheel) and the motion feel through the response of the vehicle (not shown) felt by the driver. The driver control commands are then either electronically or mechanically sent to various actuators such as powertrain actuators 142, brake actuators 144, and steering actuators 146 such that the corresponding actuators may react to the driver's control commands to move the vehicle.

Electronic controls are conducted by computing control commands in an electronic control unit (ECU) 130 and digitally sending control commands to the powertrain actuators 142, the brake actuators 144, the steering actuators 146, and suspension actuators 148. Each of the actuators 142-148 has its own sensing elements 143, 145, 147, and 149 that measure the system state of the corresponding actuator. The vehicle 150 and the vehicle environment 160 also have sensors 159 that provide input to the ECU 130 that is used for state estimation. ECU 130 includes control logics 131 which are grouped under the types of subsystems such as powertrain controller, steering controller, brake controller, and suspension controller. These controllers may also cover crossing functions which may involve several controllers simultaneously. Control logics 131 receive state estimation of system states that are computed in the following units: an operation state estimator (OSE) 132, an environment state estimator (ESE) 133, a driver behavior estimator (DBE) 134, a subsystem change detection (SCD) 135, and a vehicle state estimator (VSE) 136.

If a situation arises in which both driver control and electronic controls are simultaneously requesting transmission of control commands to the same set of actuators, any final control commands will be obtained by adding together the requested commands and sending combined commands to the actuators. Such a driver-in-the-loop controlled vehicle, under the influence of the driver and the electronic controls, may be used to characterize vehicle system features such as driving dynamics and safety.

For stability related functions, such as the integrated stability control discussed here and more particularly electronic stability control, roll stability control, and their enhancements, the vehicle state estimator 136 plays an important role. Vehicle driving dynamics and stability may be precisely controlled upon the detection of individual or various combinations of the yaw instability, roll instability, and the lateral (drifting) instability. Since the driver controls and the electronic controls co-exist, it is very important for the electronic controls to be "precisely" delivering the necessary but on-demand control actions. Otherwise, false positive or ineffective electronic control performance for the target features may cause driver unease.

Figure 2:
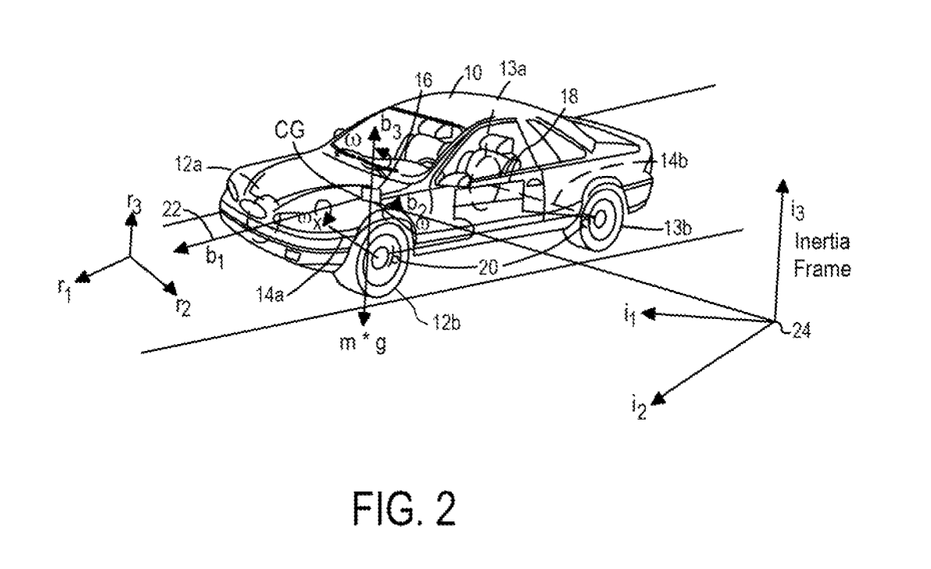
FIG. 2 is an automotive vehicle having an integrated stability control system of the present invention.

Referring to FIG. 2, an automotive vehicle 10 with an integrated stability control system of the present invention is illustrated with the various forces and moments thereon during a dynamic maneuver of the vehicle. Vehicle 10 has front right (FR) and front left (FL) wheel/tires 12A and 12B and rear right (RR) wheel/tires 13A and rear left (RL) wheel/tires 13B, respectively. The vehicle 10 may also have a number of different types of front steering systems 14a and rear steering systems 14b, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M the total mass of the vehicle. A single antenna GPS unit 15 is shown mounted in vehicle body and is in communication with a vehicle CAN bus, not shown. GPS unit 15 may also be incorporated into other subsystems such as on-board navigation, system, a vehicle connectivity system, or even a mobile or cellular phone that may communicate with the on-board communication system through Bluetooth technology.

As mentioned above, the system of the inventive subject matter may also be used with vehicle system features involving using various controls such as an active/semi-active suspension system, an anti-roll bar system, a controlled brake system, a powertrain control system, a drivetrain control system (e.g., all-wheel drive or 4 wheel drive system), a terrain management system, a driver assist and advisory system, or airbags or the other safety devices deployed or activated upon the detection of imminent or unavoidable crashes or the detection of impact with another object.

A sensing system 16 is coupled to a control system 18. The sensing system 16 has a centralized sensor cluster which contains at least 4 sensing units measuring motions of at least four degrees of freedom (DOF) of the vehicle body. It may comprise various hardware configurations including those used in ESC and RSC systems. For instance, in RSC, the sensing system contains a centralized sensor cluster having a longitudinal accelerometer, a lateral accelerometer, a roll rate, and a yaw rate sensor. RSC system also has a steering angle sensor, four wheel speed sensors, and a master cylinder pressure sensor. The sensing system 16 may also be used for other determinations such as wheel lifting detection, road profile determination, and the actuator failure detection. The wheel speed sensors 20 are mounted at each corner of the vehicle and generate signals corresponding to the rotational speed of each wheel. The motion sensor cluster in sensing system 16 may be mounted rigidly on the vehicle body with its directional position in alignment with the directions x,y and z shown in FIG. 2. As those skilled in the art will recognize, the frame from $b_1, b_2$ and $b_3$ is called a body frame 22, whose origin is fixed in somewhere in the vehicle body, with the $b_1$ corresponding to the x axis pointing forward, $b_2$ corresponding to the y axis pointing off the driving side (to the left), and the $b_3$ corresponding to the z axis pointing upward. The angular rates of the vehicle body are denoted about their respective axes as $\omega_x$ for the roll rate, $\omega_y$ for the pitch rate and $\omega_z$ for the yaw rate.

Figure 3:
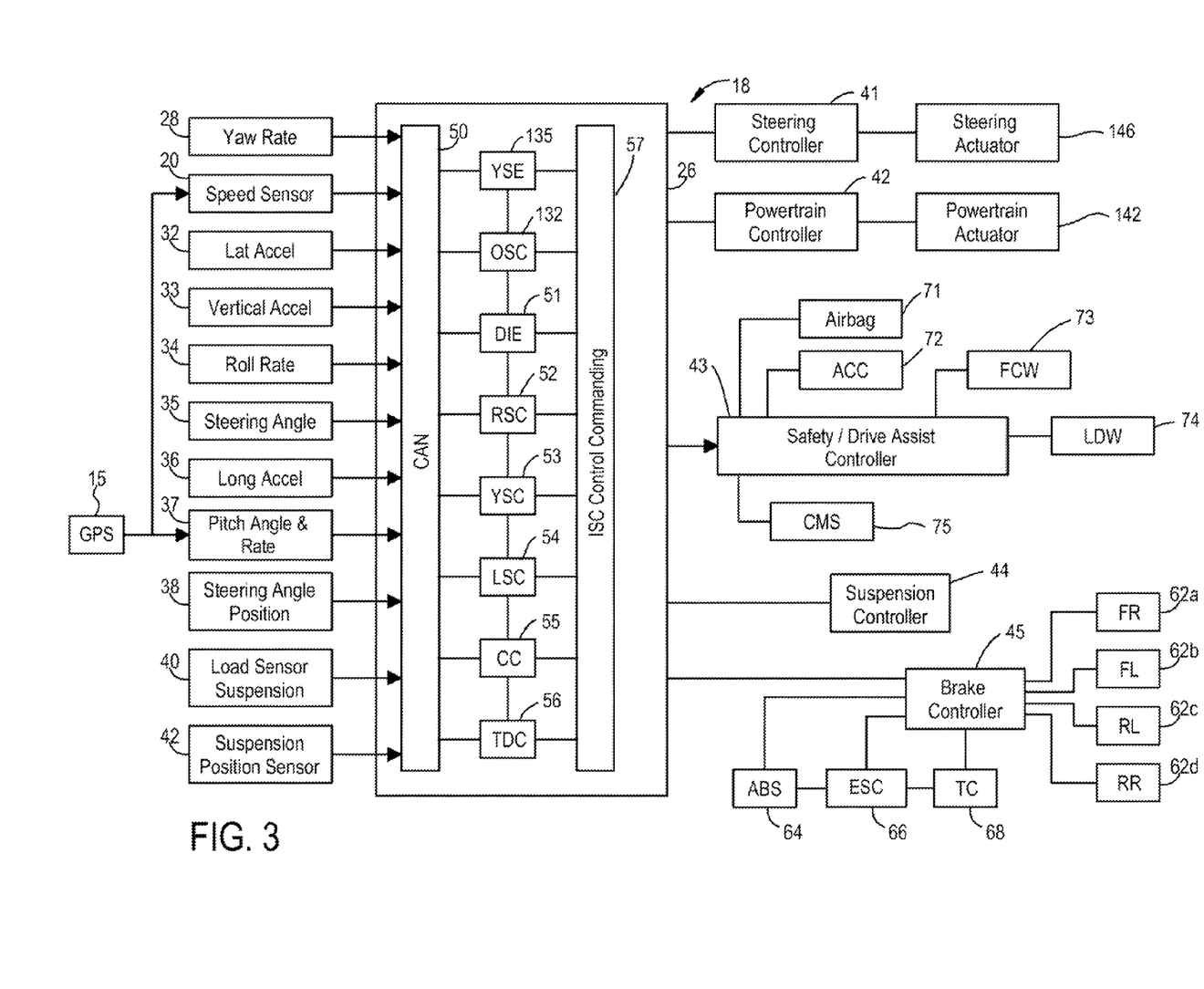
FIG. 3 is a block diagram of an integrated stability control system of the present invention.

Referring now to FIG. 3, integrated stability control system 18 is illustrated in further detail having a controller 26, which is a subset of the control logics 130 presented in FIG. 1 with a different partition, used for receiving information from a number of sensors which may include a yaw rate sensor 28, a speed sensor 20, a lateral acceleration sensor 32, a vertical accelerometer sensor 33, a roll angular rate sensor 34, a steering wheel (hand wheel) angle sensor 35, a longitudinal acceleration sensor 36, a pitch sensing unit 37, a steering angle (of the wheels or actuator) position sensor 38, suspension load sensor 40 and suspension position sensor 42. It should be noted that various combinations and sub-combinations of the sensors may be used. However, instead of using a pitch rate sensor as is typically provided, pitch sensing unit 37 is a software module that derives pitch angle and pitch rate information form GPS unit 15. Speed sensor 20 may also be replaced by a software unit through computations by receiving information from GPS unit 15. Integrating available GPS information with the sensors used in the integrated stability control enhances vehicle state estimation by replacing hardware sensors with software sensors and resulting in cost savings.

The integrated stability control system 18 contains the roll stability control function, the yaw stability control function, and the lateral stability control function and their combinations. It also includes arbitration and priority decision making units that coordinate the various control functions in a case where more than one control function is requesting actuation of the same actuators.

While the motion sensor unit 20, 28-42 may be mounted at any place of the vehicle body, some sensors are physically grouped together to formulate a centralized motion sensor cluster. In a preferred embodiment, the centralized motion sensor cluster may be located at the center of gravity of the vehicle. Those skilled in the art will recognize that the centralized sensor cluster may also be located off the center of gravity and translated equivalently thereto.

Controller 26 may include a CAN communication system 50 that is used to receive the signals from multiple sources such as sensors 20 and 28-42. CAN communication system 50 provides the signals to vehicle state estimator (VSE) 135, operation state estimator (OSE) unit 132, driver intent estimation (DIE) unit 51, roll stability control (RSC) unit 52, yaw stability control (YSC) unit 53, lateral stability control (LSC) unit 54, curve control (CC) 55, and torque distribution control (TDC) 56. All these units may communicate with each other and share computed variables through the CAN communication system 50 or internal communication channels.

The outputs from VSE 135, OSE 132, DIE 51, RSC 52, YSC 53, LSC 54, CC 55, and TDC 56 are all communicating with an integrated stability control commanding unit 57 where the individual control command requests will be prioritized, coordinated, and arbitrated based on the current driving conditions. For instance, RSC actuation might cause the vehicle under-steer in order to prevent on-road rollover from happening. Such RSC induced under-steer might initiate YSC to conduct under-steer reduction control if YSC and RSC are not coordinated at ISC commanding unit 56.

The output from ISC controller commanding unit 57 is used to drive a steering controller 41 that sends actuation request to steering actuator 146; a powertrain controller 42 that sends actuation request to powertrain actuator 142; a safety and driver assist controller 43 that sends actuation request to airbag 71, adaptive cruise control 72, forward collision warning 73, lane departure warning 74, and collision mitigation system 75; a suspension controller 44; a brake controller 45 that sends actuation request to front right brake 62a, front left brake 62b, rear left brake 62c, rear right brake 62d, anti-lock braking 64, electronic stability control 66, and traction control 68.

The vehicle state computed in VSE 135 may contain the vehicle body's roll and pitch orientation, the road bank and the road wade, the vehicle travel speed, the vehicle body's sideslip angle, the roll angle between the axle and the road surface, the yaw deviation between the actual vehicle yawing and the driver intended yawing. Several variables computed in 135 are the result of direct application of the GPS information fused with the other sensor information.

Based upon inputs from the sensors, outputs from various control units 52, 53, 54, 55, and 56, outputs from various state estimation unit 132, 133, 134, 135, 136, and 51, controller 26 may control other devices besides the steering controller 41, powertrain controller 41, safety/driver assist system 43, suspension controller 44, brake controller 45. For instance, it may be used to control a transmission system or a drivetrain system. Depending on the desired sensitivity of the system and various other factors, not all the sensors 20, 28-42 may be used in a commercial embodiment.

GPS unit 15 is typically targeted for applications such as navigation and emergency notification such as e-911 which are not related to vehicle stability control functions. Consumer grade GPS receivers for navigation and e-911 functions are capable of providing three global velocity measurements and attitude measurements with a degree of accuracy that is better than the positioning accuracy due to the use of Doppler velocity in the GPS unit. Such velocity accuracy allows the use of GPS to augment the sensing capability of inertial sensors. Hence it is desirable to use the GPS velocities to aid vehicle state estimation, and more particularly to estimate pitch rate without using vehicle pitch rate sensor.

Considering the following kinematics characterizing the sensor signals from a centralized sensor cluster of four sensor units including roll rate $\omega_x$, yaw rate $\omega_z$, longitudinal acceleration $a_x$, and lateral acceleration $a_y$, $$\dot{\theta}_x = \omega_x + \omega_z \theta_y$$

$$\dot{v}_x = a_x + \omega_z v_y + g\theta_y$$

$$\dot{v}_y = a_y - \omega_z v_x - g\theta_x \qquad (1)$$

where $\theta_x$ is the roll angle, $\theta_y$ is the pitch angle, $v_x$ is the longitudinal velocity, $v_y$ is the lateral velocity. If the longitudinal velocity $v_x$ can be determined from the other means (e.g., from wheel speed sensor signals), then theoretically Equation set (1) may be used to determine three unknowns $\theta_x$, $\theta_y$, and $v_y$.

However if we consider sensor bias $b_x$ for $a_x$, $b_y$ for $a_y$, $b_{\omega_x}$ for $\omega_x$, and $b_{\omega_z}$ for $\omega_z$, Equation set (1) should be expressed as in the following:

$$\dot{\theta}_x = \omega_x + \omega_z \theta_y - (b_{\omega_x} + b_{\omega_z}\theta_y)$$

$$\dot{v}_x = a_x + \omega_z v_y + g\theta_y - (b_x + b_{\omega_z} v_y)$$

$$\dot{v}_y = a_y - \omega_z v_x - g\theta_x - (b_y + b_{\omega_z} v_x) \qquad (2)$$

In this case, three additional independent unknowns are introduced in Equation set (2). The continuous computation of $\theta_x$, $\theta_y$, and $v_y$ using the dynamics depicted in Equation set (2) in real time would mean that additional information is needed in order to differentiate the unknowns from the sensor biases. Among the four sensor biases, $b_y$, $b_{\omega_x}$, and $b_{\omega_z}$ be removed through long term averaging ($b_y$) and zeroing during stop ($b_{\omega_x}$ and $b_{\omega_z}$). However, sensor bias $b_x$ is not as easily removed.

Hence Equation set (2) may end up with four unknowns if the sensor biases $b_y$, $b_{\omega_x}$, and $b_{\omega_z}$ are learned:

$$\dot{\theta}_x = \omega_x + \omega_z \theta_y$$

$$\dot{v}_x = a_x + \omega_z v_y + g\theta_y - b_x$$

$$\dot{v}_y = a_y - \omega_z v_x - g\theta_x \quad (3)$$

When pitch rate is added to Equation set (3), Equation set (3) leads to four unknowns of four equations. To include pitch rate, the method typically requires the addition of a pitch rate sensor to the sensor cluster. However, according to the inventive subject matter, existing GPS information is used to provide additional information to Equation set (3) so as to solve four unknowns from four equations.

Figure 4:
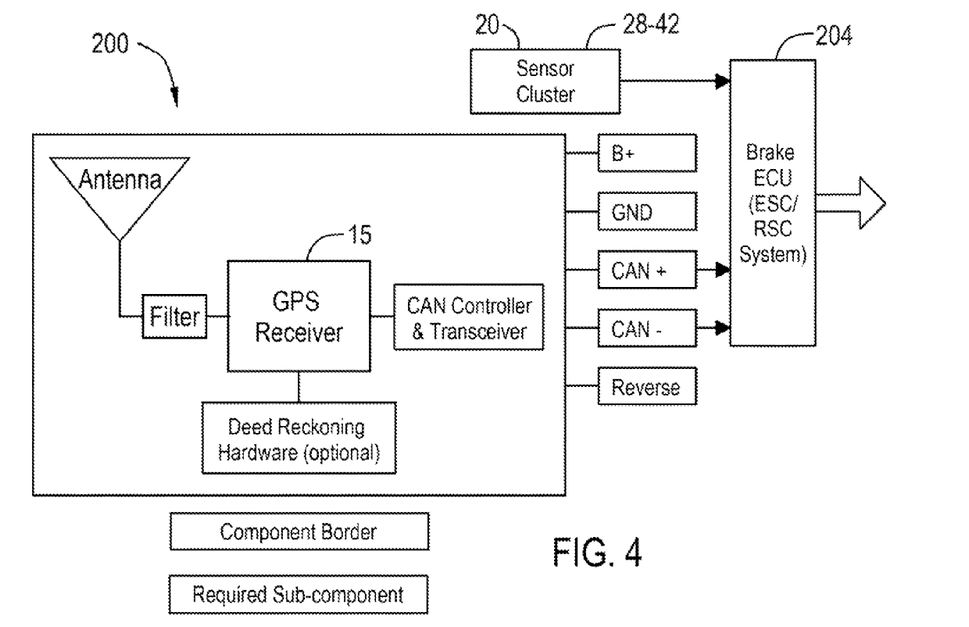
FIG. 4 is a block diagram of GPS and motion sensors networked with a brake control unit.

FIG. 4 shows a network 200 among the motion sensors 20 and 28-42, GPS 15 and a brake ECU 204. The pitch angle of a vehicle equipped with a single antenna GPS may be computed as in the following equation:

$$\tan\theta_y^{GPS} = \frac{V_{down}}{\sqrt{V_{east}^2 + V_{north}^2}} \quad (4)$$

where $V_{east}$, $V_{north}$, $V_{down}$, are the global velocities in the east, north and down directions in a local plane tangent to the earth's surface. The pitch rate for the given pitch angle can be computed as in the following $$\omega_y^{GPS} = \dot{\theta}_y^{GPS} + \omega_z \theta_x \quad (5)$$

Figure 5:
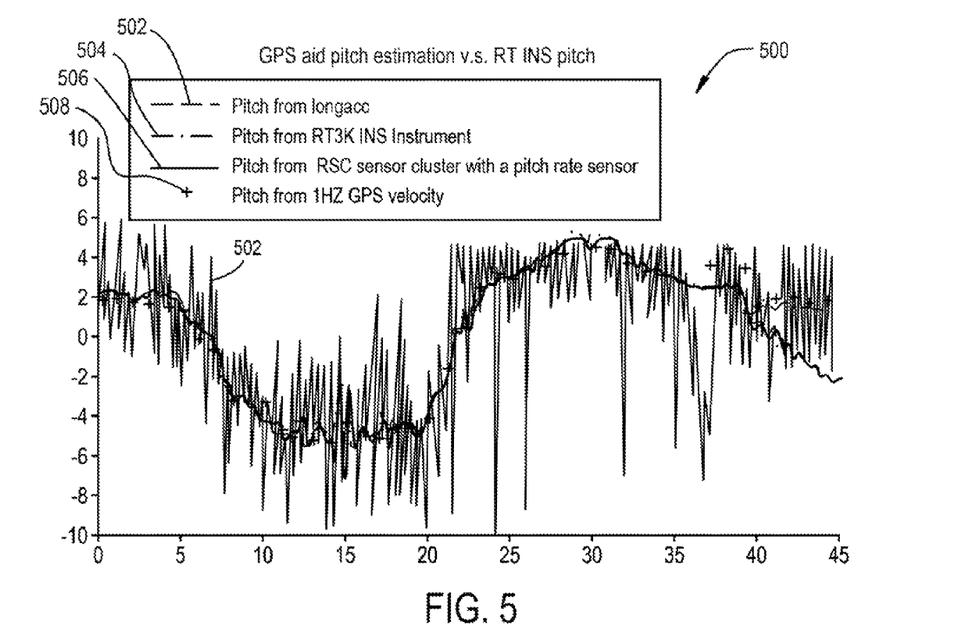
FIG. 5 is a plot comparing GPS velocity-based pitch estimations with sensor-based pitch information for normal driving on a mountain road.

The above computation has been verified using vehicle test data. FIG. 5 shows a comparison 500 of various computations of pitch angle using vehicle test data for a vehicle equipped with the ISC system during a normal driving on a mountain road. The noisy time trace 502 is a pitch angle estimate from the longitudinal accelerometer as in the following $$\Theta_y = \frac{\dot{v}_x - a_x}{g} \quad (6)$$

The time trace 504 shows the pitch angle computed in an instrumentation grade system called RT3K that may serve as the ground truth. The time trace 506 shows the pitch angle computed by using a six degree-of-freedom IMU sensor set with a pitch rate sensor included. The time trace 508 shows the pitch computed using GPS velocities according to the present invention. It is clear from the comparison that the pitch angle shown in 508 is tracking in discrete time instant (every second) the instrument grade pitch angle with maximum error around three degrees. It is apparent that the continuously computed pitch angle using IMU with a pitch rate sensor tracks the ground truth time trace for about thirty-eight seconds until it diverges from the ground truth trace 506 with a maximum error exceeding five degrees. Such an error could potentially be due to sensor offset drifting. Notice that for a given pitch angle, the pitch rate may be computed from Equation (5).

Figure 6:
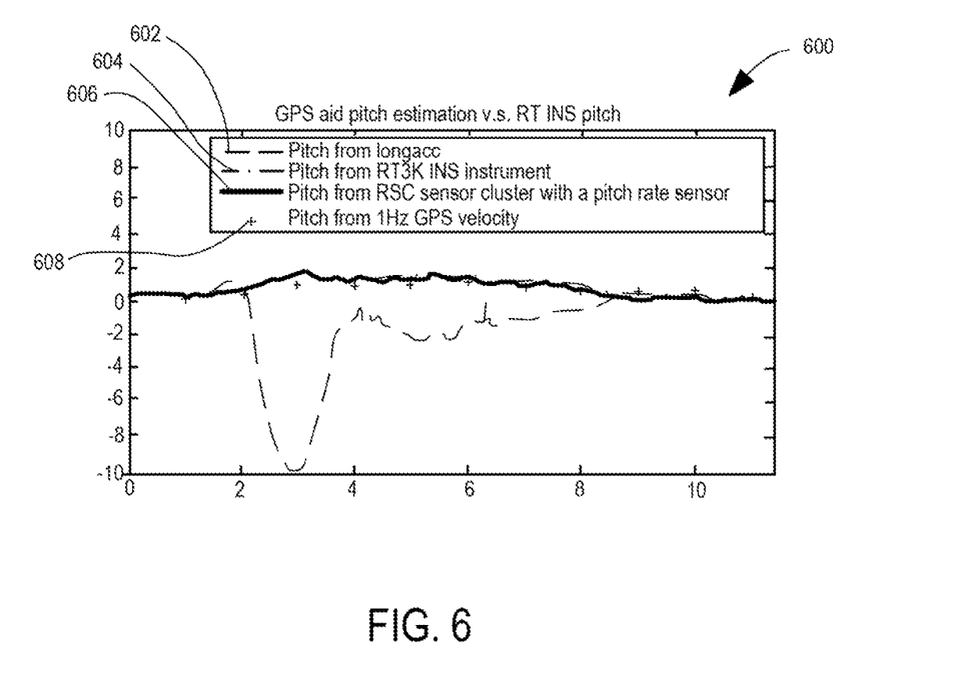
FIG. 6 is a plot comparing GPS velocity-based pitch estimations with sensor-based pitch information for aggressive driving on an icy road.

FIG. 6 shows a comparison 600 of various computations of pitch angles using vehicle test data during an aggressive maneuver. The time trace 602 is computed based on Equation (6) which diverges from the ground truth shown in time trace 604. The GPS based pitch angle is shown in time trace 606 and the IMU based pitch angle is shown in time trace 608. Both the GPS and IMU based pitch angle are tracking the ground truth time trace 604 quite well. Notice that for a given pitch angle, the pitch rate may be computed from Equation (5).

In other embodiments of the present invention, the GPS velocity-based pitch information may be used in vehicle state estimation for estimating the vehicle's lateral velocity and sideslip angle that is the control variable used for LSC.

According to the present invention a Kalman filter is used for determining lateral velocity using the GPS velocity-based pitch information. Define intermediate variables, $\Theta_x$ as follows:

$$\Theta_x = \frac{a_y - \omega_z v_x}{g} \quad (7)$$

The intermediate variables mimic conditional variables when the vehicle is in a laterally stable condition (namely, $v_y \approx 0$), so the vehicle body roll $\theta_x$ and pitch $\theta_y$ angles are expressed as in the following:

$$\theta_y = \Theta_y - \frac{\omega_z v_y}{g}; \quad (8)$$

$$\theta_x = \Theta_x - \frac{\dot{v}_y}{g};$$

Plugging the two equations of Equation set (8) into the 1$^{st}$ equation of Equation set (6) leads to:

$$\dot{v}_y - \omega_z^2 v_y = g(\dot{\Theta}_x - \omega_x - \omega_z \Theta_y) \quad (9)$$

Considering that the sensor offsets exist in both longitudinal and lateral accelerometers, a more realistic equation of (9) may be expressed as:

$$\dot{v}_y - \omega_z^2 v_y = g(\dot{\Theta}_x - \omega_x - \omega_z \Theta_y) - b_{ax} + b_{ay} \quad (10)$$

In order to use a Kalman filter to estimate $v_y$ from the above equation, the GPS velocity based pitch angle or the smoothed GPS velocity based pitch angle may be used to construct a measurement, z:

$$\tan\theta_y^{GPS} = \frac{V_{down}}{\sqrt{V_{east}^2 + V_{north}^2}} \quad (10)$$

$$z = (\Theta_y - \tan\theta_y^{GPS})g = \omega_z v_y$$

Using the measurement, z, a Kalman filter for Equation (10) can be constructed as in the following:

$$\dot{\hat{x}} = A(\omega_z)\hat{x} + Bu + K(z - \omega_z \hat{x}_1) \quad (11)$$

$$A(\omega_z) = \begin{bmatrix} 0 & 1 & 0 \\ \omega_z^2 & 0 & -1 \\ 0 & 0 & 0 \end{bmatrix}, \quad B = \begin{bmatrix} 0 \\ 1 \\ 0 \end{bmatrix}, \quad u = g(\dot{\Theta}_x - \omega_x - \omega_z \Theta_y)$$

where $x = [v_y, \dot{v}_y, b_{ay} - b_{ax}]^T$ and the GPS aided measurement is $$z^1 = (\Theta_y - \tan\theta_y^{GPS})g = \omega_z v_y + n^1 = H^1 x + n^1 \quad (12)$$

where $H^1 = [1\ 0\ 0]$.

During laterally stable vehicle operations such as straight driving, slow travel velocity, small vehicle yaw rate, small driver input and the like, a model based sideslip angle may be obtained as in the following:

$$z^2 = v_x(c_1 a_y - c_2 \dot{\omega}_z + c_3 \omega_z) = v_y + n^2 = H^2 x + n^2 \quad (13)$$

where $n^1$ and $n^2$ are the measurement noises from the GPS and motion sensor signals.

A step-by-step update may be constructed at each instant before and after a GPS sampling point. At one step before the GPS sampling point:

$$\hat{x}_k(-) = \Phi_{k-1} \hat{x}_{k-1}(-) + \Lambda_{k-1} u_k$$

$$P_k(-) = \Phi_{k-1} P_{k-1}(-) \Phi_{k-1}^T + Q_{k-1} \quad (14)$$

where $\Phi_{k-1} = (I - A_{k-1} \Delta T)^{-1}$ and $\Lambda_{k-1} = (I - A_{k-1} \Delta T)^{-1} B \Delta T$ with $A_{k-1} = A(\omega_{z_{k-1}})$, $A(\bullet)$ and $B$ are defined in Equation (10), $\Delta T$ is the sampling time. The covariance matrix $Q_{k-1}$ is selected as a constant matrix. $P_k(-)$ is the state covariance matrix. $\hat{x}_k(-)$ is the state vector. At the GPS sampling point:

$$\hat{x}_k(+) = \hat{x}_k(-) + K_k(z_k - H_k^1 \hat{x}_k)$$

$$P_k(+) = (I - K_k H_k^1) P_k(-)$$

$$K_k = P_k(-) H_k^{1T} [H_k^1 P_k(-) H_k^{1T} + R_k^1]^{-1} \quad (15)$$

At one step after the GPS sampling point:

$$\hat{x}_{k+1}(-) = \Phi_k \hat{x}_k(+) + \Lambda_k u_{k+1}$$

$$P_{k+1}(-) = \Phi_k P_k(-) \Phi_k^T + Q_k \quad (16)$$

At two steps after the GPS sampling point:

$$\hat{x}_{k+2}(-) = \Phi_{k+1} \hat{x}_{k+1}(-) + \Lambda_{k+1} u_{k+2}$$

$$P_{k+2}(-) = \Phi_{k+1} P_{k+1}(-) \Phi_{k+1}^T + Q_{k+1} \quad (17)$$

When the vehicle is at laterally stable conditions, the following update is conducted:

$$\hat{x}_k(-) = \hat{x}_{k-1}(-) + K_k(z_k^2 - H_k^2 \hat{x}_k)$$

$$P_k(+) = (I - K_k H_k^2) P_k(-)$$

$$K_k = P_k(-) H_k^{2T} [H_k^2 P_k(-) H_k^{2T} + R_k^2]^{-1} \quad (18)$$

The lateral velocity may be computed from the above state estimation x $$\begin{bmatrix} v_y \\ \dot{v}_y \end{bmatrix} = \begin{bmatrix} 1 & 0 & 0 & 0 \\ 0 & 1 & 0 & 0 \end{bmatrix} x \quad (19)$$

and the corresponding pitch angle $\theta_y$, pitch rate $\omega_y$, and roll angle $\theta_x$ may be estimated computed as in the following $$\theta_y = \Theta_y - \frac{\omega_z v_y}{g};$$

$$\theta_x = \Theta_x - \frac{\dot{v}_y}{g}; \quad (20)$$

$$\omega_y = \dot{\theta}_y - \omega_z \theta_x$$

Figure 7A:
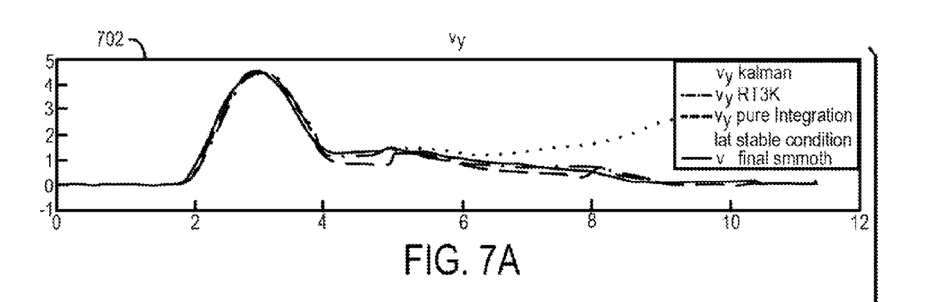
FIGS. 7A, 7B and 7C are a series of plots for test results from estimating lateral velocity according to the present invention.
Figure 7B:
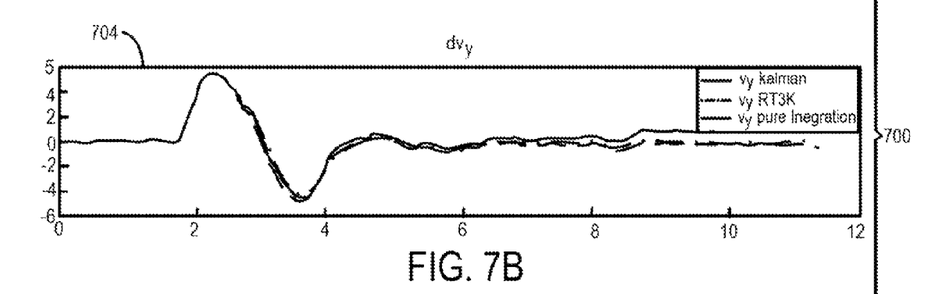
Figure 7C:
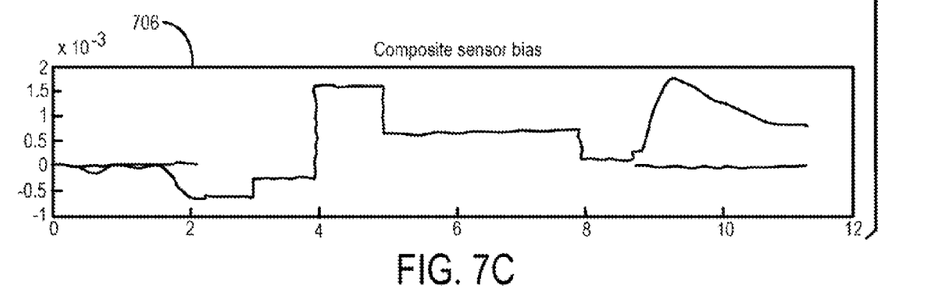

FIGS. 7A, 7B, and 7C show the time trace 700 of the variables computed from the aforementioned Kalman filter. The plot 702 shown in FIG. 7A is a comparison of various lateral velocity computations including the computation based on the aforementioned method which shows the jumps due to update at the GPS data points, the lateral velocity reference from an instrument grade devices (such as RT3K) as the ground truth, pure integration using IMU sensor signals which shows divergent trend starting at time instant t=5 seconds, and the final smooth signal by passing the GPS based Kalman filtered computation thru a low-pass filter. The plot 704 shown in FIG. 7B is the derivative of the lateral velocity computed from the Kalman filtered lateral velocity computed through the method according to this invention, the ground truth measurement from the instrumentation grade devices, the computation from IMU sensor set with pure integration method. The plot 706 shown in FIG. 7C is the updated composite sensor bias in the aforementioned Kalman filter method.

In another embodiment of the present invention, the GPS velocity sampled at 1 Hz is used as an output to fuse with the body longitudinal and vertical accelerations, which are sampled in 100 Hz in order to obtain global vertical and horizontal velocity. The compensated global velocities are then used to estimate the vehicle body's pitch angle. Such pitch angle is then fed into the last equation of (3) to obtain the lateral velocity estimation used in sideslip angle computation. Notice that the vehicle body pitch is related to road grade if the vehicle suspension-caused pitch can be estimated, which is indeed possible and is described in U.S. Pat. Nos. 6,556,908 and 6,684,140 that are herein incorporated by reference.

The slope of the road in the longitudinal direction that a vehicle is traveling on is referred to as the road grade. Road grade may be presented in two forms, either as the actual slope of the road or as the angle that the road makes with the horizon. Conversion between the two is a matter of simple trigonometry. Determination of the angle may be accomplished using a ratio of the global vertical and horizontal velocities of the vehicle as in Equation (10).

As mentioned above, the vehicle pitch or road grade computed in Equation (10) is limited by the GPS sampling rate (for the consumer grade GPS, the sampling frequency is 1 Hz) which is much slower than the sampling rate used in the brake control module that is usually 100 Hz. Namely, every 100 sample points computed in brake control will receive 1 GPS sample. A Kalman filter setup is used to estimate the vertical and longitudinal velocities. In order to relate the global velocities with the vehicle body-fixed accelerations, we use the vehicle body roll and pitch angles computed in the previous sample to rotate the current body-fixed longitudinal and vertical accelerations to $A_{down}$ for global acceleration in the down direction and $A_H$ in the global horizontal direction. The Kalman filter scheme can be summarized as in the following $$\begin{bmatrix} \dot{\hat{V}}_{down} \\ \dot{\hat{b}}_{az} \end{bmatrix} = \begin{bmatrix} 0 & -1 \\ 0 & -T_m^{-1} \end{bmatrix} \begin{bmatrix} \hat{V}_{down} \\ \hat{b}_{az} \end{bmatrix} + \begin{bmatrix} 1 \\ 0 \end{bmatrix} A_{down} + \begin{bmatrix} 0 & 0 \\ 0 & T_m^{-1} \end{bmatrix} w_z \quad (21)$$

$$y_{down} = \begin{bmatrix} 1 & 0 \end{bmatrix} \begin{bmatrix} \hat{V}_{down} \\ \hat{b}_{az} \end{bmatrix} + \eta_z$$

$$\begin{bmatrix} \dot{\hat{V}}_H \\ \dot{\hat{b}}_{ax} \end{bmatrix} = \begin{bmatrix} 0 & -1 \\ 0 & -T_m^{-1} \end{bmatrix} \begin{bmatrix} \hat{V}_H \\ \hat{b}_{ax} \end{bmatrix} + \begin{bmatrix} 1 \\ 0 \end{bmatrix} A_H + \begin{bmatrix} 0 & 0 \\ 0 & T_m^{-1} \end{bmatrix} w_x$$

$$y_H = \begin{bmatrix} 1 & 0 \end{bmatrix} \begin{bmatrix} \hat{V}_H \\ \hat{b}_{ax} \end{bmatrix} + \eta_x$$

where $\eta_x$ and $\eta_z$ are related to the measurement noises, $w_x$ and $w_z$ are related to the process noises, $\hat{V}_{down}$ and $\hat{V}_H$ represent the down velocity and the horizontal velocity $\sqrt{V_{east}^2 + V_{north}^2}$, which can be obtained from GPS information, $\hat{b}_{ax}$ and $\hat{b}_{az}$ are related to the bias estimates. The vehicle pitch angle or the road grade angle estimate is the arctangent of the two speed estimates as follows:

$$\hat{\theta}_y = \tan^{-1}\left\{\frac{-\hat{V}_{down}}{\hat{V}_H}\right\} \quad (22)$$

and the pitch rate can be computed similarly as in Equation (5)

$$\hat{\omega}_y = \dot{\hat{\theta}}_y + \omega_z \theta_x$$

Notice that the difference between the approach using Equation (10) and the approach using Equation (21) is that in the former approach the body-fixed lateral velocity was updated together with the GPS pitch angle, while in the latter approach, the GPS pitch is updated independently of the body-fixed lateral velocity update.

Figure 8:
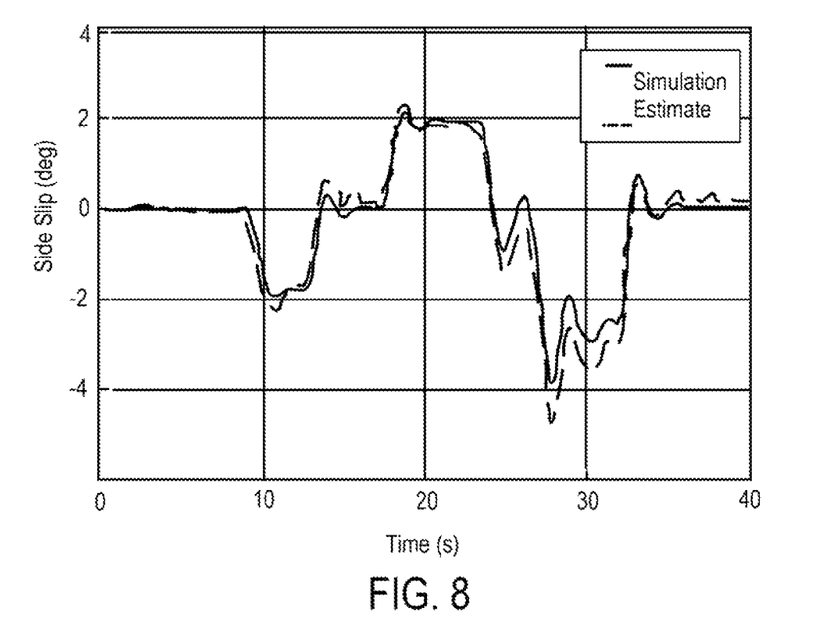
FIG. 8 is a comparison of sideslip estimation according to the present invention and a simulation.
Figure 9:
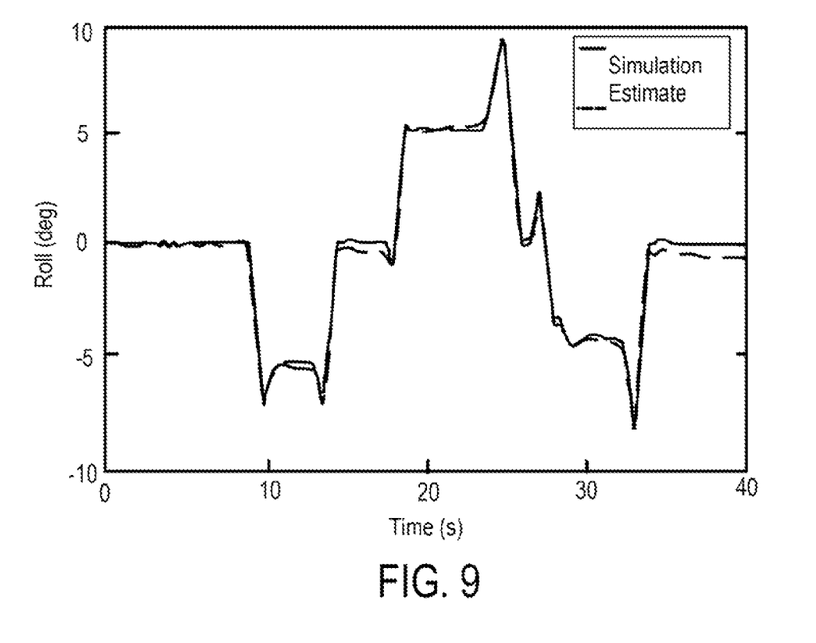
FIG. 9 is a comparison of roll angle estimation according to the present invention and a simulation.

Simulation data was generated to compare sideslip estimate incorporating the GPS aided pitch computation using Equation (2). FIG. 8 shows the sideslip angle as it is estimated according to the present invention in comparison to a simulated sideslip angle. FIG. 9 shows similar results for roll angle.

While the method of the present invention may be used for directly computing the vehicle body-fixed lateral velocity or sideslip angle, it may also feed a smoothed GPS velocity based pitch angle to the current RSC control module to fully utilize the existing lateral velocity computation.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A pitch sensing system including pitch computation used by an integrated stability control system of a motor vehicle, the system comprising:
    a GPS receiver for acquiring global vehicle velocities in three dimensions that are east, north and down directions in a local plane tangent to the earth's surface; and
    a pitch computation estimated, in a controller, using the global vehicle velocities and provided as an input to the integrated stability control system, the pitch computation further comprises a pitch angle computation and a pitch rate computation.

2. The pitch sensing system as claimed in claim 1 further comprising:
    a roll stability control motion sensor set having a lateral acceleration sensor, a longitudinal acceleration sensor, a yaw rate sensor and a roll rate sensor;
    a GPS velocity sampled at a predetermined frequency and integrated with the roll stability control motion sensor set;
    an estimate of a vehicle body sideslip angle based on the GPS velocity sample integrated with the roll stability control motion sensor set.

3. The pitch sensing system as claimed in claim 1 further comprising:
    a roll stability control motion sensor set having a lateral acceleration sensor, a longitudinal acceleration sensor, a yaw rate sensor and a roll rate sensor;
    a GPS velocity sampled at a predetermined frequency and integrated with the RSC motion sensor set;
    an estimate of a vehicle body roll angle with respect to sea level based on the GPS velocity sample integrated with the roll stability control motion sensor set.

4. The pitch sensing system as claimed in claim 1, further comprising:
    a Kalman filter for estimating a lateral velocity, a lateral velocity derivative, a lateral acceleration bias, and a longitudinal acceleration bias.

5. The pitch sensing system as claimed in claim 1 further comprising:
    a roll angle computation; and
    a lateral velocity computation;
    the pitch angle computation, the pitch rate computation, the roll angle computation, and the lateral velocity computation each have a sampling rate that is faster than a sampling rate for the GPS.

6. The pitch sensing system as claimed in claim 1 further comprising:
    the global vehicle velocities being sampled at a predetermined sampling rate;
    a vertical vehicle body acceleration value;
    a longitudinal vehicle body acceleration value;
    compensated global vehicle velocities based on a combination of the global vehicle velocities, the vertical vehicle body acceleration value and the longitudinal vehicle body acceleration value; and
    the pitch angle and the pitch rate estimated from the compensated global vehicle velocities and the GPS global vehicle velocity.

7. The pitch sensing system as claimed in claim 6 further comprising a Kalman filter for estimating the vertical and longitudinal vehicle body acceleration values at a sampling rate which is faster than the predetermined sampling rate.

8. The pitch sensing system as claimed in claim 1 wherein the global vehicle velocities further comprise a global vertical velocity and a global horizontal velocity and the pitch angle and the pitch rate are estimated from a ratio of the global vertical velocity and the global horizontal velocity.

9. An integrated stability control system for a motor vehicle having a GPS receiver capable of acquiring three-dimensional vehicle velocity measurements, the integrated stability control system comprising:
- a single roll rate sensor for providing a roll rate signal indicative of a roll rate of the motor vehicle;
- a pitch computation indicative of the vehicle pitch angle and pitch rate as it is estimated in a controller using at least the three-dimensional vehicle velocity measurements acquired from the GPS receiver in east, north and down directions in a local plane tangent to the earth's surface; and
- the controller using at least the roll rate signal and the pitch angle signal for integrated stability control.

10. The integrated stability control system as claimed in claim 9 further comprising a lateral velocity signal estimated using the pitch angle signal and pitch rate signal, the lateral velocity signal being an input to the controller.

11. The integrated stability control system as claimed in claim 9 further comprising a sideslip angle signal estimated using the estimated pitch angle and pitch rate and input to the controller.

12. The integrated stability control system as claimed in claim 9 wherein a pitch computation indicative of a pitch angle and pitch rate further comprises a pitch angle and pitch rate as it is estimated using the three-dimensional vehicle velocity measurements that are compensated for using body-fixed vehicle accelerations.

13. A method for estimating a pitch computation of a motor vehicle having a GPS receiver and at least one stability control system, the method comprising the steps of:
- acquiring three dimensional global vehicle velocity measurements in east, north and down directions in a local plane tangent to the earth's surface from the GPS receiver;
- estimating, in a controller, a pitch angle and pitch rate of a vehicle using the three-dimensional global vehicle velocity measurements;
- inputting the estimated pitch angle and pitch rate to the stability control system.

14. The method as claimed in claim 13 wherein the step of inputting further comprises inputting the estimated pitch angle and pitch rate to an integrated stability control system and further comprising the step of controlling a roll stability of the vehicle using the estimated pitch angle and pitch rate.

15. The method as claimed in claim 13 wherein the step of inputting further comprises inputting the estimated pitch angle and pitch rate to an integrated stability control system and further comprising the step of controlling a yaw stability of the vehicle using the estimated pitch angle and pitch rate.

16. The method as claimed in claim 13 wherein the step of inputting further comprises inputting the estimated pitch angle and pitch rate to an integrated stability control system and further comprising the step of controlling a lateral stability of the vehicle using the estimated pitch angle and pitch rate.

17. The method as claimed in claim 13 further comprising the steps of:
- estimating a lateral velocity using the estimated pitch angle and pitch rate;
- inputting the estimated lateral velocity to the integrated stability control system; and
- controlling roll stability of the vehicle using at least the estimated lateral velocity.

18. The method as claimed in claim 13 further comprising the steps of:
- estimating a lateral velocity using the estimated pitch angle and pitch rate;
- inputting the estimated lateral velocity to the integrated stability control system; and
- controlling yaw stability of the vehicle using at least the estimated lateral velocity.

19. The method as claimed in claim 13 further comprising the steps of:
- estimating a lateral velocity using the estimated pitch angle and pitch rate;
- inputting the estimated vehicle sideslip angle to the control system; and
- controlling lateral stability of the vehicle using at least the estimated lateral velocity.

20. The method as claimed in claim 13 further comprising the steps of:
- estimating a vehicle sideslip angle using the estimated pitch angle and pitch rate;
- inputting the estimated vehicle sideslip angle to the control system; and
- controlling roll stability of the vehicle using at least the estimated vehicle sideslip angle.

21. The method as claimed in claim 13 further comprising the steps of:
- estimating a vehicle sideslip angle using the estimated pitch angle and pitch rate;
- inputting the estimated vehicle sideslip angle to the control system; and
- controlling yaw stability of the vehicle using at least the estimated vehicle sideslip angle.

22. The method as claimed in claim 13 further comprising the steps of:
- estimating a vehicle sideslip angle using the estimated pitch angle and pitch rate;
- inputting the estimated vehicle sideslip angle to the control system; and
- controlling lateral stability of the vehicle using at least the estimated vehicle sideslip angle.

* * * * *